Sept. 9, 1958   D. A. DAHLSTROM, ET AL   2,851,161
PRESSURE FILTRATION METHOD AND APPARATUS
Filed June 10, 1955
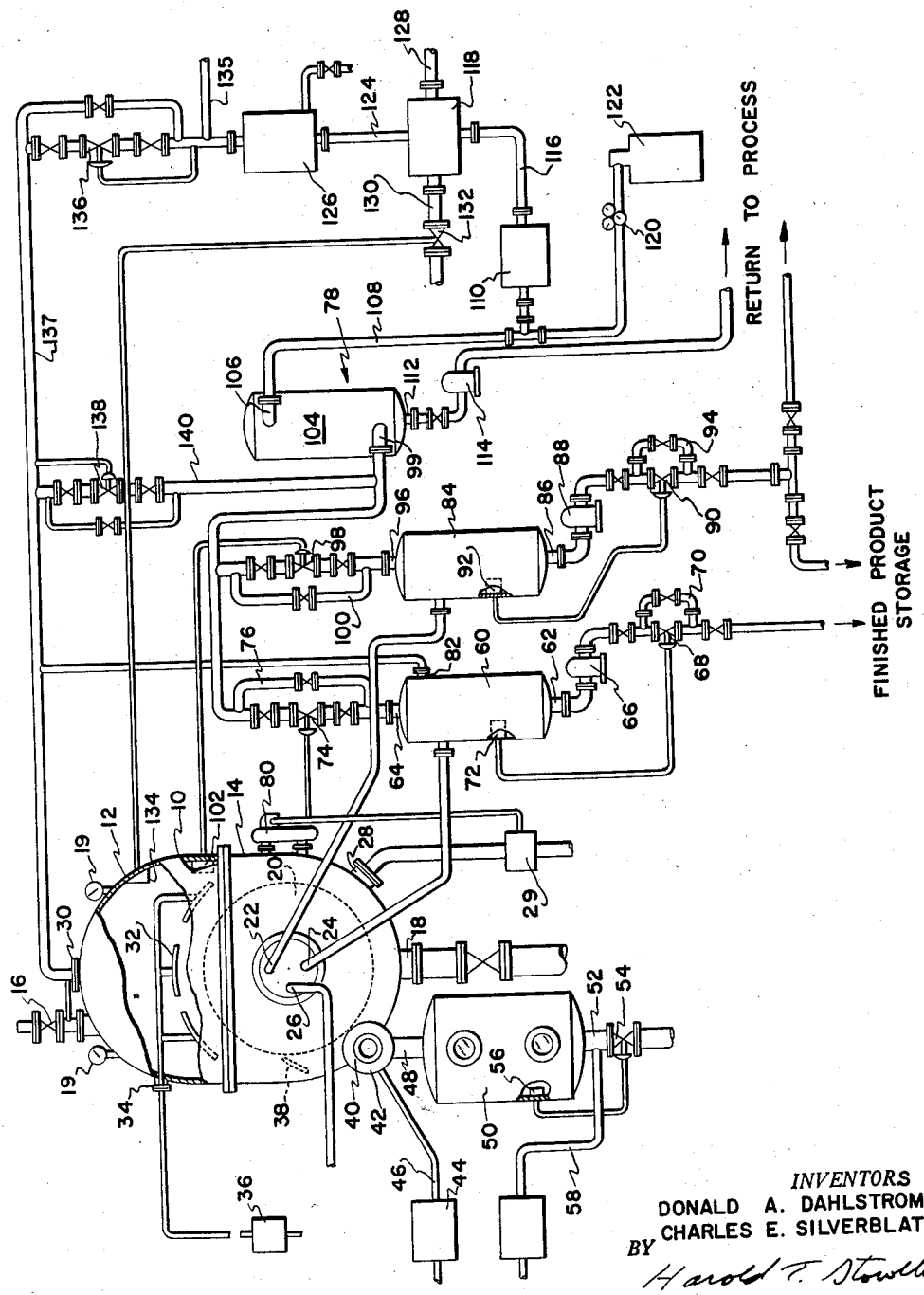
INVENTORS
DONALD A. DAHLSTROM
CHARLES E. SILVERBLATT
BY
Harold T. Stowell

United States Patent Office 2,851,161
Patented Sept. 9, 1958

2,851,161

PRESSURE FILTRATION METHOD AND APPARATUS

Donald A. Dahlstrom, Deerfield, and Charles E. Silverblatt, Palatine, Ill., assignors, by mesne assignments, to The Eimco Corporation, Salt Lake City, Utah, a corporation of Delaware Application June 10, 1955, Serial No. 514,624

10 Claims. (Cl. 210—66)

The present invention relates to new and improved methods and apparatus for continuous pressure filtration.

It has been heretofore the general practice in continuous filtration systems to employ vacuum-type filters utilizing atmospheric pressure as the driving force within the filter with filter cake and filtrate removal being accomplished at gauge pressures below zero.

It has been discovered, however, that the utilization of a pressure rather than a vacuum-type filter produces substantial advantages in certain fields of filtration. For example, where highly volatile materials are to be handled in a continuous filtration process, pressure filtration avoids those disadvantages inherent in vacuum filtration such as vaporization flashing of filtrate in low pressure areas within the system; requirements for oversized vacuum producing equipment necessary to maintain pressure differentials within the system to produce the required driving forces; and oversized condenser equipment necessary to minimize attendant production and heat loss, fractional vaporization with mixed liquids and foaming.

Further, in filtration of liquids of high viscosities, or sludges with substantial solid particle content, a driving force greater than one atmosphere is necessary to maintain maximum and economical filtration rates. It has been found that vacuum filters have insufficient driving force to yield desirable filtration rates and to enable formation of a suitable filter cake. Pressure filters enable the achievement of sufficient driving forces to accomplish these necessary functions and also to operate at high temperatures for the purpose of reducing the viscosity of liquids without incurring the possibilities of filtrate flashing as would be the case in vacuum systems.

Pressure filtration has also proved to be desirable over vacuum filtration in the handling of saturated solutions which would exhibit excessive crystallization with temperature reductions caused by vaporization, and in the handling of organic liquids which "set up" with like temperature reductions.

There have been certain prior art pressure filter systems which have exhibited advantages over vacuum systems in those fields above referred to, but these prior systems have proved extremely costly in installation and operation because of their requirements for continuous manual control and maintenance during operation.

It is, therefore, a general object of the present invention to provide greatly improved and novel methods and apparatus for continuous pressure filtration which serve to advance the art by producing new and useful results heretofore unknown in the art.

A principal object of this invention resides in the provision of an arrangement, with continuous pressure filtration apparatus, of automatic control methods and devices providing for stable, controlled filtration operation on a variety of products of varying filterability, such as successive batches of products of the same general nature where there is substantial variation in composition and physical characteristics from batch to batch.

It is one object of the present invention to provide continuous pressure filtration methods and apparatus which function to automatically control back pressure on the dry side of filtration thereby automatically maintaining absolute pressure control within the filter shell providing, at all times and under all operating conditions, a maximum pressure drop across the filtration phase thereby resulting in the continuous maintenance of maximum filtration rates.

It is another object to provide filtration methods and apparatus which automatically control the filtration rate through back pressure control on the filtrate discharge side of the filtration phase, and the back pressure control being automatically operated from liquid level sensing apparatus within the filter shell.

A further object of this invention is the provision of filtration methods and apparatus which provide automatic control of filtration rates through apparatus serving to automatically regulate liquid level within the shell by control of slurry feed, the liquid level regulating apparatus being correlated with the back pressure control on the filtrate discharge side of the filtration phase which also serves to regulate filtration rates.

Still another object of this invention resides in the provision of continuous pressure filtration methods and apparatus which includes means for automatically controlling the temperature within the filter shell through regulated temperature control of the insert gas medium continuously supplied to the shell under pressure for the purpose of maintaining a controlled pressure within the shell.

A still further object of this invention is the provision of new and improved pressure filtration methods and apparatus which provide for automatically controlled filter cake washing and discharge with a maximum filter cake recovery.

Still another object of this invention is the provision of methods and apparatus for pressure filtration which enable the handling of slurry feed to the filter at maximum temperatures to accommodate liquids of high viscosities thereby resulting in filter operation at maximum filtration rates.

Yet another object of this invention is the provision of pressure filtration methods and apparatus in which vaporization of volatile material is automatically maintained at a minimum despite high temperature and pressure characteristics present within the system.

An additional object and advantage of this invention is the provision of continuous pressure filtration methods and apparatus which enable the provision of a filtration system at a minimum initial cost which will operate automatically at maximum efficiencies and with a minimum requirement for maintenance and repair.

Still further objects and advantages of the present invention will become apparent to those skilled in the art when the following general statement and description are read in the light of the accompanying drawings.

The nature of the apparatus constituting a part of the present invention may be stated in general terms as comprising a continuous pressure filtration system which includes a filter shell, a rotary filter element in the shell, a slurry feed for the shell, filter cake removal and discharge means, two separate filtrate receiving means communicating with the filter element of the shell having gas and filtrate discharge outlets, back pressure control means in one filtrate receiver gas outlet operatively controlled by liquid level sensing means associated with the filter shell, back pressure means on the filtrate outlet receiver maintaining a liquid seal in the outlet, back pressure control means in the second filtrate receiver gas outlet operatively controlled by pressure sensing means within the filter shell, back pressure means on the filtrate outlet on the second filtrate receiver maintaining a liquid seal in the outlet, a gas compressor supplied from the gas outlets of the filtrate receivers, a gas cooler on the discharge side of the compressor, cooling rate control means associated with said cooler regulated from temperature sensing apparatus from within the filter shell, pressure control means on the discharge side of the cooler regulating delivery of gas to the filter shell, and liquid level sensing means in the shell automatically controlling slurry feed to the shell.

The nature of the new and improved methods constituting a part of the present invention may be stated in general terms as including the steps of supplying slurry to a filter element housed in a pressure shell, introducing an inert gaseous medium to the shell at a constant regulated pressure, discharging filtrate and gas from said filter element, successively, into each of two receivers, into the first receiver while a given compartment of the filter element is substantially submerged in slurry, into the second receiver while the same compartment of the filter element is substantially above the slurry and while the resultant filter cake on the element is undergoing drying, separating filtrate and gas within the receivers, discharging gas from the receivers into a compressor, controlling the back pressure in the second receiver by pressure sensing means within the gas filled portion of the filter shell, discharging filtrate from both receivers through filtrate sealed outlets, compressing the gas discharged from the receivers to increase its temperature and pressure above the requirements of the shell, cooling the gas to a temperature regulated by thermostatic apparatus within the shell, delivering the gas to the shell at a controlled constant pressure, and controlling the feed of slurry to the shell by liquid level responsive apparatus within the shell.

Referring now to the accompanying drawings:

Fig. 1 is a diagrammatic flow sheet of the continuous pressure filter system constituting a part of the present invention.

The present invention is illustrated and described herein as a system for the handling of quaternary ammonium salt slurry utilizing a closed nitrogen atmosphere and employing isopropyl alcohol as a filter cake washing liquid. The system is also disclosed as embodying a rotary drum-type filter construction within the filter shell for rotation within the slurry bath. However, the specific structural embodiments of the present invention as they are disclosed for handling the particular materials above set forth are for purposes of illustration only since the basic concepts and principles of the present invention, as well as the methods of filtration forming a part of the invention, are readily adaptable to any continuous pressure filtration system employing any of the known structural components and without limitation as to the particular materials to be handled.

FILTER APPARATUS

In the illustrative embodiment of the invention as shown in the accompanying drawings the filter apparatus includes a pressure shell 10 having upper and lower flanged sections 12 and 14 forming a removable head and shell base. The shell is provided with a pop-off-type safety valve 16 in the head portion 12 thereof and a bottom, valved drain outlet 18 in the underside of the base portion. The shell can carry suitable pressure and temperature indicators 19 and can be supported above a floor by any suitable cradle or foundation construction (not shown).

There is mounted for rotation within the shell a rotary filter drum 20 which would be of conventional compartmented construction having discharge outlets from a hub portion thereof through a single port discharge valve which alternately communicates with two separate filtrate outlet connections 22 and 24, and a gas blow-back connection 26.

An inlet connection 28 enters the shell at an intermediate point therein for supplying slurry to the shell from a constant volume slurry feed pump 29 to form a bath in the filter shell within which the drum 20 rotates to filter recoverable liquid therefrom and to build filter cake deposits on the filter drum from solid materials suspended in the slurry. The shell is also provided with a gas inlet 30 in the head portion thereof for the purpose of supplying an inert gaseous medium, under pressure, to the shell to create a desired pressure head within the shell which, in turn, provides for the necessary and conventional driving force within the filter phase of the system.

Associated with the filter shell is a plurality of spray headers 32 which are arranged concentrically above the upper portion of the rotating drum 20 in spaced relationship thereto, and the headers are connected through an inlet 34 in the shell to a pump 36 which supplies a cake washing liquid to the headers to be directed against cake accumulations on the filter drum. Additionally, conventional scraper members 38 are supported within the shell in association with the rotating drum in such a manner as to scrape and remove filter cake from the drum surface as the drum rotates within the shell.

A conventional screw-type conveyor 40 is positioned within the lower portion of the shell at a point directly beneath the scraper members 38 for the purpose of receiving filter cake separated from the drum and for conveying the cake outwardly of the shell to a usual repulper 42 located adjacent the outer wall of the shell and in communication with the conveyor.

Associated with the repulper 42 is a regulator pump member 44 which supplies through a line 46 a regulated volume of heated liquid to be mixed with the cake for purposes of dilution of the cake. The repulper 42 is provided with a discharge outlet 48 which communicates with a filter cake receiver tank 50 into which the cake is discharged. The cake receiver tank 50 is, in turn, provided with a discharge outlet 52 which carries a restricted flow throttling control valve 54 which is automatically throttled from a liquid level sensing apparatus 56 within the receiver tank which serves to maintain a liquid seal in the discharge of the tank at all times. Additional liquid can be introduced into the discharge 52 of the tank 50, in advance of the throttling valve 54, through a line 58 for the purpose of insuring maintenance of sealing liquid in the bottom of the tank.

However, it will be apparent to those skilled in the art that repulping of the filter cake may be accomplished within the filter shell and the repulped cake slurry discharged therefrom through suitable valve means.

FILTRATE PHASE

The filtrate phase of the system is initially divided into two parts which are characterized by the nature of the filtrate discharge from the filter. The above referred to outlets 22 and 24 from the filter drum through the shell are both filtrate outlets, with the outlet 22 having communication with an upper region of the drum and carrying a weak filtrate mixed with a substantial quantity of the inert gas from within the drum which is driven through the system by the pressure head maintained within the filter shell. The outlet 24 communicates with the drum at a lower portion therein and as a consequence carries a more strongly concentrated filtrate with a lesser quantity of the inert gas than is discharged through outlet 22.

Associated with the outlet 24 is a filtrate receiver tank 60, into which the combined gas and filtrate are tangentially introduced, which is provided at its lower end with a filtrate outlet 62, and at its upper end with a gas outlet 64. The filtrate outlet 62 communicates with a filtrate pump 66 which, in turn, communicates through a restricted flow throttling control valve 68 with a collection point (not shown) for receiving and storing processed filtrate. The throttling valve 68, which is provided with a valved bypass 70, is operatively connected to a liquid level sensing device 72 within the receiver tank 60 which control device serves to automatically regulate flow through the valve 68 for the purpose of maintaining a liquid seal in the outlet 62 of the tank at all times.

The gas outlet 64 on the receiver tank 60 communicates through a restricted flow valve 74, which is provided with a valved bypass 76, with a moisture trap 78. The restricted flow valve 74 on the gas outlet of the receiver tank 60 has operative connection with a float control device 80 associated with the filter shell 10. This control device 80 is of a known construction and operates to transform the buoyancy of a body partially submerged in the slurry within the shell into a pneumatic signal proportional to the degree of submergence which signal operates a controller which pneumatically actuates valve 74. Thus, a drop in the slurry level within the filter shell due to increase in filtration rate will automatically act to restrict valve 74. A restricted flow through valve 74 produces a pressure increase in filtrate discharge line 24 and receiver 60 thereby reducing the available pressure differential for filtration driving force. This pressure differential reduction permits an increase in slurry level within the filter shell. Regulation of the slurry feed pump 29, to be hereinafter described, is based on high-level shut-off of the pump if the filtration rate drops sufficiently to cause the liquid level within the shell to rise beyond the control point.

On the other hand, it would be possible to regulate the slurry feed pump by a restricted flow throttling control valve operated from liquid level sensing apparatus within the shell in such a manner as to maintain a maximum slurry level and thereby a maximum rate of filtration.

In addition, there is associated with the receiver tank 60 an orifice-type inlet 82, either of a fixed orifice or a fixable needle valve construction, which is connected to the source of compressed inert gas supplied to the shell to permit a flow of 2 to 5 C. F. M. into the tank at the pressure drop equivalent to the difference between normal shell pressure and atmospheric pressure.

The second or weak filtrate discharge outlet 22 from the filter drum communicates with a second filtrate receiver tank 84 which, like the first described tank 60, is provided with a filtrate outlet 86 in the lower end thereof communicating with a pump 88 which discharges through a restricted flow throttling valve 90 controlled from a liquid level sensing device 92 within the tank through a selective valve controlled fitting 93 either to filtrate collection point, or it is returned to the process. The liquid level controlled flow valve 90 is provided with a valved bypass arrangement 94.

The receiver tank 84 is also provided at its upper end with a gas outlet 96 which communicates through a restricted flow throttling control valve 98 with the moisture trap 78, being connected through a common inlet 99 thereinto with the gas discharge from the first tank 60. The restricted flow valve 98 is provided with a valved bypass 100, and the valve 98 is operatively connected with a pressure sensing device 102 in the form of a pressure tap or diaphragm type pressure communication located in the head portion of the pressure shell, which causes opening and closing of the restricted flow valve 98 in response to pressure changes within the filter shell.

The moisture trap 78 takes the form of a cylindrical tank 104 into which the gas discharges from the filtrate receiver tanks 60 and 84 are introduced tangentially to provide for convolute gas flow within the tank, for gas and filtrate separation, and a tangentially positioned gas outlet 106 serves to discharge gas from the moisture trap through a line 108 having communication with the suction side of a gas compressor 110. The lower end of the moisture trap is provided with a filtrate discharge outlet 112 which communicates with a pump 114 which discharges the liquid from the trap back into the process.

GAS PHASE

The gas compressor 110, which can be any desired type or construction, receives gas from the discharge of the moisture trap 78 and compresses the gas which in turn is discharged through an outlet line 116 to an after-cooler 118. The suction side of the compressor may be connected through a preset gas pressure regulator 120 to a source 122 of compressed inert gas which serves as a make-up gas supply for the compressor when the discharge from the moisture trap recedes below the preset pressure of regulator 120.

The compressed gas, which is greatly increased in temperature by compression, is cooled in after-cooler 118 to be discharged therefrom through line 124 to a gas-liquid separator 126. The after-cooler 118 is of a liquid type wherein cooling liquid is introduced through an inlet 128 to the cooler and is discharged through an outlet 130 from the cooler. Associated with the outlet 130 is a restricted flow throttling valve 132 operatively connected to a temperature sensing device 134, such as a thermocouple, within the head portion of the filter shell 10. The thermostat serves to control, through operation of valve 132, the flow of cooling liquid through the after-cooler 118 thereby regulating the temperature of the gas discharged from the cooler to the separator 126.

The gas discharging from separator 126 passes through a restricted flow control valve 136 which is of the pressure regulator type and which in turn discharges heated, compressed gas through line 137 to the gas inlet 30 in the head of the filter shell 10, while maintaining a higher pressure of fixed relationship to shell pressure, upstream of valve 136. A gas bleed-off 135 is connected in advance of the valve 136 and supplies blow-back gas to drum connection 26 which is at a pressure sufficiently in excess of shell pressure to satisfactorily perform blow-back function.

Additionally associated with the gas phase of the system is a restricted flow pressure control valve 138 which has an inlet connection with the gas supply line 137 to the shell inlet 30 and which discharges gas through a line 140 into the common inlet connection 99 on the moisture trap 78. The setting of the pressure control valve 138 is determined in accordance with the setting of the pressure regulator 102 within the filter shell for purposes to be hereinafter described.

It is to be understood that there is no intention to limit the particular control valve devices utilized in the present system since any restricted flow throttling control valves of pneumatic or electrical operation which will satisfactorily perform the functions herein described will be sufficient for incorporation in the present structure. By the same token, numerous commercially available buoyancy or electrically operated liquid level sensing devices would be sufficient to incorporate in the present construction where appropriate functions are to be performed.

OPERATION

In the operation of a continuous pressure filtration system of the type heretofore described, the slurry is fed to the filter shell by a constant speed pump and it is separated within the filter into liquid and solid components by the filter drum whereupon the solid components which build up in the form of filter cake on the drum are discharged through the conveyor and repulper and the liquid filtrate is discharged through the two filtrate discharge connections to the respective strong filtrate and weak filtrate receiver tanks 60 and 84. In the receiver tanks the filtrate is separated from any of the inert gaseous medium which is carried over from the filter shell through the filter into the filtrate discharge.

The filtrate is discharged from both the strong and weak filtrate receiver tanks through filtrate pumps to a collection source with the discharge outlets from both receivers having constantly maintained liquid seals therein formed by operation of the restricted flow outlet valves controlled from liquid level control apparatus from within the receivers. The maintenance of liquid seals in the filtrate outlets of the two receiver tanks insures the ability to maintain a pressure head within the receivers for the purpose of causing gas discharge outwardly of the gas outlets therein through the restricted flow valves associated with the gas outlets.

By utilizing the intelligence of the float control 80 on the filter shell to regulate the flow of gas through the outlet of the strong filtrate receiver tank 60 a back pressure is maintained within the receiver tank and on the filtrate outlet 24 from the drum. By regulating the back pressure on the filtrate outlet 24 in direct response to the slurry level within the filter shell an automatic and positive control is maintained on the filtration rate within the filtration phase of the system thereby insuring maximum efficiency of operation of the filter at all times. The utilization of an orifice inlet 82 having communication with the compressed inert gas source supplied to the filter shell permits a delivery of compressed gas to the filtrate receiver tank 60 whenever the tank reaches atmospheric pressure thereby insuring a back pressure condition within the tank at all times to facilitate the positive control actuation of the back pressure flow valve 74.

In utilizing the restricted flow discharge valve 98 on the gas discharge side of the weak filtrate receiver tank 84 with the valve controlled from a pressure sensing device 102 within the head portion of the filter shell, an automatic and positive control is maintained at all times on the back pressure within the filtrate receiver tank 84 and on the weak filtrate discharge 22 from the drum. By maintaining an accurately controlled back pressure on the filtrate discharge 22 from the filter drum a positive and accurate control of the pressure within the filter shell is obtained which insures maximum efficiency of filter operation.

The gas medium which is separated from the filtrate in the receiver tanks 60 and 84 and in the moisture trap 78 is compressed within the compressor 110 to temperatures and pressures in excess of those required of the gas forming the atmosphere within the filter shell thereby enabling positive control of the temperature of the gas supplied to the filter shell through utilization of the aftercooler 118 in which the gas cooling rate is controlled in direct response to thermostatic apparatus 134 located within the filter shell. In this manner it is possible at all times to maintain a constant temperature within the filter shell by control of the temperature of the inert gas supplied thereto, thus permitting temperature controls consistent with the requirements established by the viscosities of the materials handled within the filter.

The liquid level control apparatus 80 can act to control filtration rate in either of two ways. In the case of a constant speed and volume slurry pump it may serve as a high-limit shut-off sensing means in the manner as heretofore described. It is also possible to derive a proportional signal from the liquid level control apparatus 80 to regulate either the speed or volume output of the pump, so as to maintain a constant liquid level in the filter shell 10. Regulation of the volume output may be readily accomplished by the utilization of a throttling restricted control valve such as disclosed herein at 68 or 90.

In further effort to insure the obtaining of maximum filtration rates, the cake washing liquid supplied to the spray headers is delivered in a controlled ratio to the volume of slurry feed so that control of slurry feed in the manner heretofore described will insure simultaneous control of cake wash liquid, so that the amount of wash liquid is held within the specified limits of dilution of the finished product, at the same time providing adequate wash liquid for removal of valuable filtrate from the cake.

It can be further seen that in operation a unique provision is made for the obtaining of two pressure levels with the use of a single compressor wherein the automatic pressure control valve 136 on the discharge side of the separator 126 maintains a back pressure above that pressure required within the pressure shell whereupon gas is made available to be bled off as at 135 for use in supplying the inlet connection 26 for purposes of filter blow-back. Thus the gas bled off at 135 is in effect used twice since it is used to blow back for removal of filter cake, whereupon it enters the continuous system at shell operating pressures to be redirected back through the filter for discharge through outlet 22 to the weak filtrate receiver tank.

Valve 138 serves as a safety device in that it functions if and when the pressure in the filter shell rises more than a set amount above the pre-selected shell pressure control point, such as might occur due to a restriction or stoppage of flow in advanced portions of the system. Upon functioning, the valve 138 bypasses that amount of gas required to limit pressure in the filter shell 10 and in line 137 to the pre-selected limit control point.

For the purposes of further clarity and understanding of this invention, and in accordance with the example above set forth as to one of many possible utilizations of the methods and apparatus heretofore disclosed, an outline of operation of the present apparatus is hereinafter shown without any intention of limitation to be evidenced by the details set forth in the outline.

*Example*

Filter: rotary drum type having a filter area of about 18 square feet.

Slurry: a mixture of quaternary ammonium compounds and sodium chloride crystals, dissolved and suspended in isopropyl alcohol wherein the sodium chloride amounts to approximately 10% of the total weight.

Slurry feed rate: 750 G. P. H.
Infeed gas: 170° F. at 40 p. s. i. g.
Blow-back gas: 45 p. s. i. g.
Strong filtrate rate: 10 G. P. M. approx.
Weak filtrate rate: 2 G. P. M. approx.

Control set to maintain the following conditions:

In the shell (10):
    Pressure_____ 40 p. s. i. g.
    Temperature__ 170° F.
    Liquid level__ 50% Submergence of the filter drum In the first receiver, strong filtrate (60):
    Pressure (valve 74)_____ 0–35 p. s. i. g.
    Liquid level (valve 68)__ 25% of receiver volume In the second receiver, weak filtrate (84):
    Pressure (valve 98)_____ 10–35 p. s. i. g.
    Liquid level (valve 90)__ 25% of receiver volume In the cake receiver (56):
    Liquid level_____ 25% of receiver volume
    Valve 120_____ 2 p. s. i. g. gas for make-up.
    Valve 136_____ Maintains 50 p. s. i. g. upstream.
    Valve 138_____ Relieves at 45 p. s. i. g. upstream.
    Valve 132_____ Passes approximately 1 G. P. M. cooling water.

Isopropyl alcohol wash:
    Temperature_____ 170° F.
    Pressure_____ 90 p. s. i. g.
    Flow rate_____ 0.8 to 4.0 G. P. M.

Repulper water:
    Flow rate_____ 40 G. P. M. maximum
    Temperature_____ 170° F.

Thus it can be seen from the foregoing that a filtration system has been provided which is a continuous closed system wherein positive control of pressures and temperatures are obtained within the filter shell for the automatic and accurate control of pressure differentials establishing driving force in the filtration phase of the cycle and, of utmost importance, accurate automatic control of filtration rates in the filtration phase of the cycle.

It is also apparent that apparatus has been provided comprising a continuous pressure filtration system which enables the practice of unique and useful methods of pressure filtration which produces substantial new and improved results in the art.

It will also be apparent that various modifications may be made in the apparatus shown and described and in the methods of operation thereof. For example, it has been found where substantially constant slurry feeds are to be filtered or where substantially high back pressures are employed, that the filter of the invention may be economically operated if a second compressor is employed to supply pressure fluid for the shell.

The suction side of the second compressor would be connected to the gas discharge from the filtrate receiver 84 and the compression side of the compressor would be connected to the gas cooler 118. If the second compressor is employed a moisture trap similar to trap 104 should be provided in the line connections.

Having thus described and explained the new and useful apparatus and methods constituting the present invention which attain and satisfy all of the objects and advantages heretofore set forth, what is desired to be claimed is:

1. In a continuous pressure filtration apparatus, a filter shell housing a filter member, means for supplying the shell with slurry, filtrate receiving means having communication with the filter member, separate gas and filtrate discharge outlets on the filtrate receiver, a back pressure control valve in the gas outlet of the filtrate receiver, preset pressure regulating means associated with the filter shell operably controlling the back pressure valve on the filtrate receiver, and a liquid level controlled filtrate outlet valve on the filtrate receiver maintaining a liquid seal therein, whereby the internal pressure in the filter shell is automatically maintained at a preselected pressure.

2. In continuous pressure filtration apparatus, a filter shell housing a filter member, means for supplying the shell with slurry, filtrate receiving means having communication with the filter member, separate gas and filtrate discharge outlets on the filtrate receiver, a back pressure control valve in the gas outlet of the filtrate receiver, liquid level controlled means associated with the filter shell operatively controlling the back pressure valve, and a liquid level controlled filtrate outlet valve on the filtrate receiver maintaining a liquid seal therein, whereby the filtration rate in the filter is automatically maintained at a preselected constant.

3. Continuous pressure filtration apparatus as defined in claim 1 wherein the filter shell is supplied with a constant pressure gaseous medium, means controlling the temperature of the gaseous medium supplied to the filter shell, and said control means including temperature sensing means in the filter shell whereby the internal filter shell temperature is automatically regulated.

4. Continuous pressure filtration apparatus as defined in claim 1 wherein the slurry is delivered to the shell by a constant volume pump, and liquid level sensing means in the filter shell is operatively connected to the slurry feed pump.

5. Continuous pressure filtration apparatus as defined in claim 1 wherein filter cake washing apparatus is positioned in the filter shell, variable volume pump means connecting a source of washing liquid with the cake washing apparatus, the volume of cake washing liquid being proportioned to the volume of slurry feed.

6. In continuous pressure filtration apparatus, a filter shell housing a filter element, means for supplying the shell with a slurry to be filtered, means for supplying the shell with a constant pressure gaseous medium, means for removing and discharging filter cake formations, a first filtrate receiver having communication with a lower region of the filter element, a second filtrate receiver having communication with an upper region of the filter element, said first and second receivers each having a lower filtrate outlet communicating with a suction pump and an upper gas outlet connected to a gas-moisture separator, back-pressure control valves in the gas outlets of both filtrate receivers, filtrate outlet valves in each receiver controlled by the receiver liquid level, the back pressure valve in the gas outlet of one of the two receivers being operably controlled by liquid level responsive means in the filter shell, the back pressure valve on the gas outlet of the second receiver being operatively controlled by pressure sensing means in the shell, the gas-moisture separator having a lower liquid outlet communicating with the suction side of the filtrate receiver discharge suction, a discharge pump and a gas outlet connected to the suction side of a compressor, a gas cooler on the discharge side of the compressor having pressure regulated communication with the filter shell, the cooling rate of said cooler being controlled by temperature sensing means in the filter shell, and liquid level sensing means in the shell operably controlling operation of the slurry feed pump; whereby the filter rate of the apparatus is automatically maintained.

7. Continuous pressure filtration apparatus as defined in claim 6 wherein filter cake washing sprays are mounted in the filter shell, and a washing liquid feed pump supplies said sprays with a liquid volume in preselected ratio with the volume of slurry feed.

8. Continuous pressure filtration apparatus as defined in claim 6 wherein the compressed gas communication with the filter shell is provided with a pressure regulating valve maintaining constant pressure gas delivery to the filter shell, the pressure valve is provided with an associated gas bleed-off, and said bleed-off communicates with filter element blow-back apparatus.

9. A method of continuous pressure filtration including the steps of supplying slurry to a filter element housed in a pressure shell into which is introduced an inert gaseous medium at a constant pressure, discharging filtrate from said filter element to a filtrate receiver, separating filtrate and inert gas within the receiver, discharging separated gas from the receiver to a compressor, controlling the back pressure of the gas discharge from the receiver by pressure sensing means within the filter shell, regulating the temperature of the compressed gas from temperature sensing and control means within the filter shell, delivering the gas at controlled temperature to the shell at a constant pressure, removing filter cake from the shell through a liquid sealed receiver, and supplying filter cake washing liquid to cake washing apparatus in the shell at a volume preselected relative to the volume of slurry delivery to the shell.

10. In a continuous pressure filter including a pressure shell receiving a slurry feed and a compressed inert gaseous medium, the method of automatically controlling and maintaining the internal pressure of the shell including the steps of discharging filtrate and gas to a filtrate receiver, separating filtrate and gas within the receiver, discharging the filtrate from the receiver while maintaining a filtrate seal on the discharge, discharging the gas from the receiver, and controlling the back pressure on the receiver gas discharge from pressure sensing means within the filter shell.

References Cited in the file of this patent

UNITED STATES PATENTS

| | | |
|---|---|---|
| 935,743 | Collier | Oct. 5, 1909 |
| 1,512,321 | Wait | Oct. 21, 1924 |
| 1,043,553 | Wales | Nov. 5, 1912 |
| 2,081,296 | Gard | May 25, 1937 |
| 2,107,664 | Gee | Feb. 8, 1938 |